United States Patent [19]

Emerson

[11] Patent Number: 5,421,387
[45] Date of Patent: Jun. 6, 1995

[54] ASYMMETRICAL TIRE TREAD

[75] Inventor: John R. Emerson, Simpsonville, S.C.

[73] Assignee: Michelin Recherche et Technique S.A., Granges-Paccot, Switzerland

[21] Appl. No.: 911,596

[22] Filed: Jul. 10, 1992

[51] Int. Cl.⁶ .............................................. B60C 11/06
[52] U.S. Cl. ............................. 152/209 A; 152/209 R
[58] Field of Search .......... 152/209 R, 209 A, 209 D; D12/141-148

[56] References Cited

U.S. PATENT DOCUMENTS

| | | | |
|---|---|---|---|
| D. 207,619 | 5/1967 | Hunter | D12/141 |
| D. 228,635 | 10/1973 | Vizina, Jr. | D12/143 |
| D. 325,365 | 4/1992 | Covert et al. | D12/147 |
| D. 326,075 | 5/1992 | Covert et al. | D12/147 |
| D. 336,872 | 6/1993 | Hodges et al. | D12/143 |
| 3,155,135 | 1/1963 | Klenk | 152/353 |
| 4,635,694 | 1/1987 | Hosokawa | 152/209 A |
| 4,785,863 | 11/1988 | Tsuda et al. | 152/209 A |
| 4,840,210 | 6/1989 | Kukimoto | 152/209 A |
| 4,848,429 | 7/1989 | Mezzanotte | 152/209 A |
| 4,905,748 | 3/1990 | Kukimoto et al. | 152/209 A |

FOREIGN PATENT DOCUMENTS

| | | | |
|---|---|---|---|
| 1159345 | 12/1983 | Canada | 152/209 A |
| 0148721 | 7/1985 | European Pat. Off. | 52/209 A |
| 0370699 | 5/1990 | European Pat. Off. | 152/209 R |
| 0428472 | 5/1991 | European Pat. Off. | |
| 0009315 | 1/1986 | Japan | 152/209 D |
| 159108 | 2/1988 | Japan. | |

*Primary Examiner*—Michael W. Ball
*Assistant Examiner*—Nancy T. Krawczyk
*Attorney, Agent, or Firm*—Robert R. Reed; Alan A. Csontos

[57] ABSTRACT

An asymmetrical tread for a tire has a midcircumferential plane and an inner side and an outer side when mounted on a vehicle wheel. The longitudinally extending ribs in a central segment have substantially equal surface contact areas and their contact surface ratios sequentially decrease when taken from the outer side to the inner side of the tread. Two lateral ribs have equal surface contact areas with the first lateral rib at the innermost lateral segment having a contact surface ratio less than the second lateral rib at the outermost later segment of the tread. The tread rubber volume is equal on the two sides of the midcircumferential plane of the tread. The improvements in performance compared to other asymmetrical tire treads is realized in maintaining good straight ahead driving features for the tread of this invention. Improvements in tire performance for vehicle turn maneuvers and for unsymmetrical vehicle wheel camber are realized. In particular, improved tread wear, snow traction, tire noise, lateral traction and overall vehicle handling has been achieved.

12 Claims, 6 Drawing Sheets

ASYMMETRICAL TIRE TREAD

BACKGROUND OF THE INVENTION

1. Technical Field

This invention relates generally to a pneumatic tire and in particular to a tire for an automobile, light truck or the like and having a specific tread configuration.

2. Description of the Prior Art

A properly mounted tire is subject to vehicle operating conditions in which inner and outer halves of the tire are subject to different and diverse loads. For example, during a cornering maneuver of the vehicle, a lateral acceleration of the vehicle transfers more load to each tire located to the outside of the vehicle during a turn. During such a maneuver the wheels of the vehicle on which the tires are mounted may not remain perpendicular to the road surface on which the vehicle operates. This tendency for the wheels to not remain perpendicular to the road surface results in an angle between a line extending normal to the road surface and the plane of a wheel which is defined in the industry as the camber angle. Furthermore, the outer half of each tire located to the outside of the vehicle during a turn is subjected to a larger normal force than the inner half of the tire. The tire deforms laterally with respect to the wheel plane adjacent to tire-road interface during a turn. The combination of lateral deflection of the tire, the camber angle of the wheel and a normal force distribution, for example, produces the different operating conditions between the inner and outer halves of the tire.

The different operating conditions for the inner half of the tire compared with the outer half of the tire have been compensated for by asymmetrical tread patterns. For example, U.S. Pat. No. 3,155,135 discloses a tire tread having a rib pattern on one half and a block pattern on the other half of the tread. These different tread pattern halves compensate the tire for differences in vehicle operating conditions by providing improved contact with the road surface.

U.S. Pat. No. 4,848,429 discloses a tire with a tread portion having circumferential ribs on one half of the tread and a tread block pattern on the other half of the tread. In U.S. Pat. No. 4,848,429 the block pattern of the tread is for maximizing traction and other road-holding performance features during adverse environmental conditions such as snow covered or frozen ground. The ribs of the tread assure good tire performance under clear, dry or wet road conditions. An overall value of the ratio of tread contact area to the gross area in the contact patch between the tire and the road (contact surface ratio), for nominal operating conditions of load and inflation pressure is between 0.50 and 0.80. However, the contact surface ratio for the outside tread portion has a relatively high value, compared with the average value of the tire, to increase its gross area in contact with the ground surface. The results of U.S. Pat. No. 4,848,429 were lessened through a "greater disposition for having a more rapid and irregular wearing-out of the tread". Other aspects of the tire disclosed in U.S. Pat. No. 4,848,429 compensate for different operating conditions for the inside tread portion and the outside tread portion of the tire by including diverse elastomeric compositions and diverse tread thicknesses of the two tread portions.

U.S. Pat. No. 4,785,863 discloses differening tread patterns on either half of the tire tread. One pattern is particularly suitable for use on a dry road and the other pattern is suitable for use on a wet road. The rigidity of the land portions partitioned by lateral inclined grooves is different between both sides of the tire tread. The half with a relatively large pitch length of lateral grooves and a small inclination angle enables relatively good traction on dry roads due to wide land areas of high rigidity. The half with a relatively small pitch length of lateral grooves and large inclination angles enables relatively good traction on wet roads as a result of narrow land areas of low rigidity. Improved steering controllability and stability on both wet and dry roads were obtained with large pitch lateral inclined grooves and small inclination angles being to the outside of the vehicle. For this outside tread pattern portion the ratio of the contact area to the groove in the tread contact patch is relatively large and the rigidity of the land portion is high.

The tread configuration disclosed in U.S. Pat. No. 4,840,210 reduces abnormal shoulder wear by having the diameter of the tread outer shoulder larger than the diameter of the tread inner shoulder. The shearing rigidity of the tread on the tire outer shoulder is larger than the shearing rigidity on the inner shoulder by varying the groove depth across the tire to offset an undesirable lateral force induced by the different shoulder diameters. The result of this design appears to add an unsymmetrical mass to the tire and a built in conicity.

Japanese Publication No. 63-159108 discloses a tread surface having a plurality of circumferentially extending ribs where the contact surface ratio in an axial direction varies. This tread pattern configuration enhances the traction characteristics of the tire on dry road surfaces and makes abrasion of the tire uniform. Further, the tire is mounted "inside out" for running on a wet road surface to obtain similar performance characteristics to that of a symmetrical tire tread pattern running on a dry road surface. This "inside out" running requires cumbersome and time consuming dismounting and remounting of the tires on a rim. The tread pattern has no symmetry of rib surface contact areas about a midcircumferential plane of the tire.

What is generally desired for good performance from a tire, whether operating in straightaway driving, cornering, accelerating or braking condition, is a strong directional stability or handling, very low rolling resistance, excellent riding comfort, relatively low noise emission, relatively high milage tread life and relatively good traction. Also, the mass of the tire should be as low as possible for the loading range specified without decreasing the endurance or durability of the tire. Vehicle operating conditions such as cornering and camber conditions vary forces widthwise across the tire contact area and should be compensated for in a tire along with the vehicle operating conditions of straightaway driving. Furthermore, vehicle suspension systems are such that unsymmetrical as well as symmetrical deflections and angles are imposed on the vehicle tire-wheel system. Symmetrical deflections and angles imposed on a asymmetrical tire tread is a performance challenge not solved by the prior art.

Therefore, there is a need for a new tire with an asymmetrical tread having optimum tire performance during asymmetrical vehicle operating conditions as well as optimum performance during symmetrical vehicle operating conditions such as straightaway driving. The asymmetrical tire tread being more desirable than the symmetrical tire tread due to the criticality of asymmetrical vehicle operating conditions on the life of the tire. A mud and snow rating is also desirable for the tire, especially in light truck operations.

SUMMARY OF THE INVENTION

It is an objective of the present invention to realize improvements in the overall performance of a tire having an asymmetrical tread when subjected to all operating conditions on a passenger car, light truck or the like. The tire shall be realized that has a plurality of features to give good performance during symmetrical vehicle operating conditions as well as during asymmetrical vehicle operating conditions.

The present invention is directed to a tire with an asymmetrical tread. The tire has a midcircumferential plane, and an inner side and an outer side. The tire is for mounting on a vehicle wheel. The tread comprises a plurality of longitudinal extending ribs each between said inner and said outer sides with each rib having a circumferential length. The ribs are contained in a central segment plus two lateral segments of the tread. Each adjacent pair of ribs is separated by a respective uninterrupted see-through longitudinal groove. Each of the ribs has a circumferential surface contact area axially distributed over the circumferential length. Each rib has a rib width defined as the distance measured along a direction perpendicular to the midcircumferential plane between the outermost edge and the innermost edge portions. Each rib has a contact surface ratio defined as a ratio between the circumferential surface contact area and the product of the rib width times the circumferential length. The longitudinal extending ribs in the central segment of the tread have substantially equal first surface contact areas. The contact surface ratio of the ribs in the central segment of the tread sequentially decrease when taken from the outer side to the inner side of the tread. The effect of the asymmetrical tread of this invention gives good vehicle performance during symmetrical as well as asymmetrical vehicle operating conditions.

In one embodiment each of the grooves has a see-through groove width taken perpendicular to the midcircumferential plane of the tread. The widths of the see-through grooves sequentially decrease when taken from the outer side to the inner side of the tread.

In another embodiment of the asymmetrical tread the longitudinal extending ribs include a first lateral rib contained in the innermost lateral segment of the tread and a second lateral rib contained in the outermost lateral segment of the tread. Preferably the first lateral rib may have a surface contact area substantially equal to the surface contact area of the second lateral rib. The first lateral rib may also have a contact surface ratio less than the contact surface ratio of the second lateral rib.

An embodiment of the asymmetric tread described above further includes a first intermediate rib located to the outer side of the midcircumferential plane. The contact surface ratio of the first intermediate rib may be substantially equal to the contact surface ratio of the first lateral rib. Furthermore, a first surface contact area of the ribs in the central segment of the tread may have a value approximately sixty-five percent of a second surface contact area of the first and second lateral ribs in the two lateral segments of the tread.

Additional embodiments of the tread include a center rib symmetrically located with respect to the midcircumferential plane. The center rib has a predetermined value for the contact surface ratio. The first intermediate rib may have a contact surface ratio greater than the predetermined value for the center rib. The contact surface ratio for the first intermediate rib may be about 0.10 greater than the contact surface ratio for the center rib. The tread further comprises a second intermediate rib located to the innermost side of the midcircumferential plane. The contact surface ratio for the second intermediate rib has a value of at least 0.60. The second intermediate rib may have a contact surface ratio less than the predetermined value for the center rib. The contact surface ratio for the center rib may also be less than the contact surface ratio for the first intermediate rib. The second intermediate rib has the smallest contact surface ratio for any longitudinal extending rib of the tread.

A further embodiment of the tread involves the second lateral rib contained in the outermost lateral segment. The second lateral rib may have a contact surface ratio in the range of 120 percent to 130 percent of the predetermined value for the center rib. Furthermore, the first lateral rib contained in the innermost lateral segment may have a contact surface ratio in a range of 105 percent to 120 percent of the predetermined value for the center rib.

In another embodiment the center rib has a center width symmetrical with respect to the midcircumferential plane of the tread. The first intermediate rib may have a first width in the range of 80 percent to 85 percent of the center width. The first lateral rib may have a first lateral width in a range of 125 percent to 135 percent of the center width. The second intermediate rib may have a second width is in a range of 105 percent to 110 percent of the center width. The second lateral rib may have a second lateral width in a range of 115 percent to 125 percent of the center width.

A further embodiment of this invention is a tire to be used on a vehicle having a suspension system components that induce unsymmetrical camber to a wheel position and produce uneven normal forces on a ground contact area of the tire. The tire includes a pair of beads, a carcass extending between and attached to the beads. A tread rubber is radially outward of the carcass and a belt package in the crown portion of the tire. Asymmetric tread components are formed in the tread rubber. The asymmetric tread components evenly distributes the vertical loading on the tire. The even distribution of the vertical load minimizes uneven and abnormal wear of the tire. The asymmetrical tread components offset the unsymmetrical vertical loads from camber induced at the wheel position. The ribs have equal surface contact areas in a central portion of the tread rubber.

BRIEF DESCRIPTION OF THE DRAWINGS

The features of the present invention will become apparent to those skilled in the art to which the present invention relates from reading the following specifications with reference to the accompanying drawings in which.

DETAILED DESCRIPTION OF THE PREFERRED EMBODIMENTS

Figure 5:
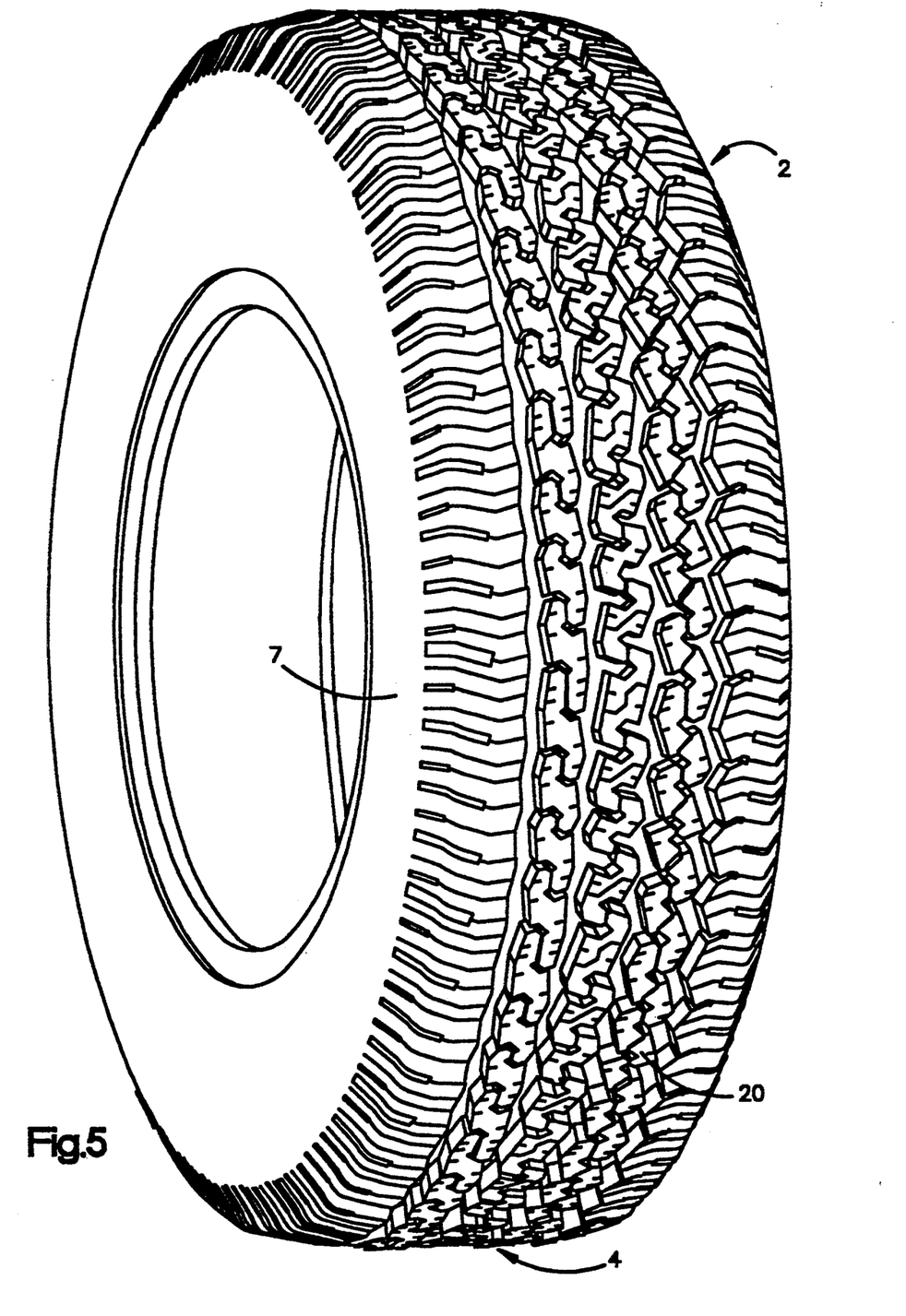
FIG. 5 is a perspective view of a tire showing the asymmetrical tread design illustrated in FIG. 2.
Figure 6:
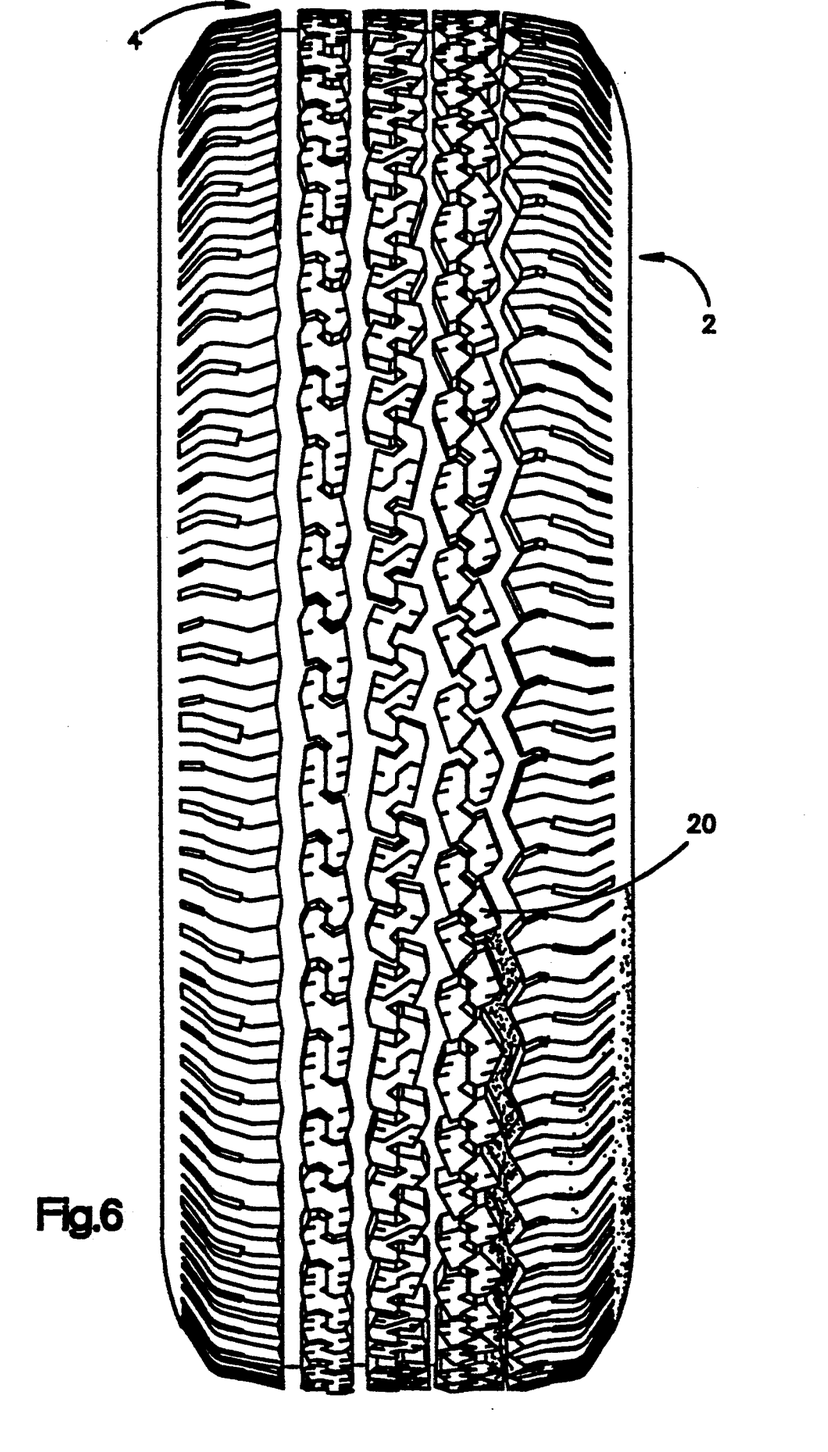
FIG. 6 is a front elevation view of the tire in FIG. 5.
Figure 7:
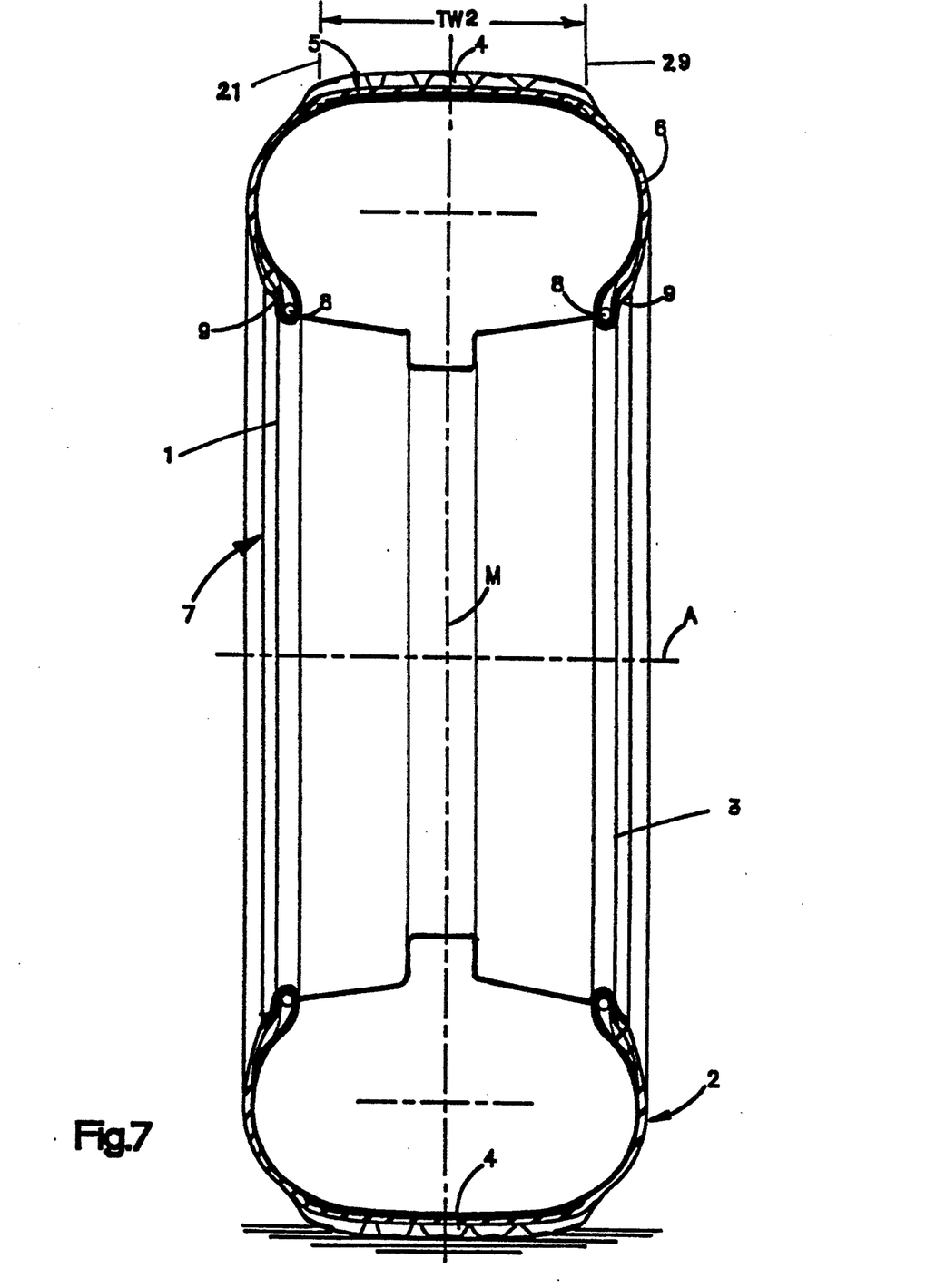
FIG. 7 is a cross-sectional view of the tire in FIG. 5 on a rim.

A radial pneumatic tire 2 having a tread embodying the present invention is illustrated in FIGS. 5, 6 and 7. The tire 2 is for mounting on a vehicle wheel which is connectable with an axle of an automotive vehicle such as a passenger car, light truck or the like. The tire 2 is rotatable about a longitudinal central axis A (FIG. 7). A midcircumferential plane M extends perpendicular to axis A and bisects the tire 2. The tire 2 includes a radial carcass 6 extending between a pair of beads 8. Axially opposite ends 9 of the carcass 6 are secured to a respective bead 8. The carcass 6 is flanked by two sidewalls 17. The tire 2 includes a ground contacting tread rubber 4 radially outward of the central crown portion of the carcass 6. A belt package 5 is located between the carcass 6 and the tread rubber 4.

An asymmetrical tread 20 (FIGS. 2, 5 and 6) is formed in the tread rubber 4 of the tire 2. The asymmetrical tread 20 has a tread width TW2 defined as the axial distance widthwise across tire measured within the footprint of the tire 2 when the tire 2 is contacting a road surface and an when the tire 2 is inflated to a design pressure and loaded to a rated load. The tread width TW2 is symmetrical with respect to a midcircumferential plane M of the tire 2 (FIG. 7). The asymmetrical tread 20 includes five longitudinally extending ribs 22, 24, 25, 26 and 28 spaced axially apart widthwise over the tread width TW2. The longitudinally extending ribs 22, 24, 25, 26, 28 are separated by a respective uninterrupted see-through groove 42, 44, 46 or 48. Each circumferential zigzag groove 42, 44, 46, 48 has a respective see-through width G2, G4, G6, G8 measured perpendicular to the midcircumferential plane M. The see-through width is the clear uninterrupted space between the axial extent of each rib. Each circumferential rib 22, 24, 25, 26, 28 has a respective rib width R2, R4, R5, R6, R8 measured perpendicular to the midcircumferential plane M. Each rib width is defined by the peak-to-peak axial extent of the respective rib. The ribs 22, 24, 25, 26, 28 are bounded in the axial direction by the see-through grooves 42, 44, 46, 48 and the first and second sides 21, 29 to form rib widths R2, R4, R6, R6, R8.

Figure 2:
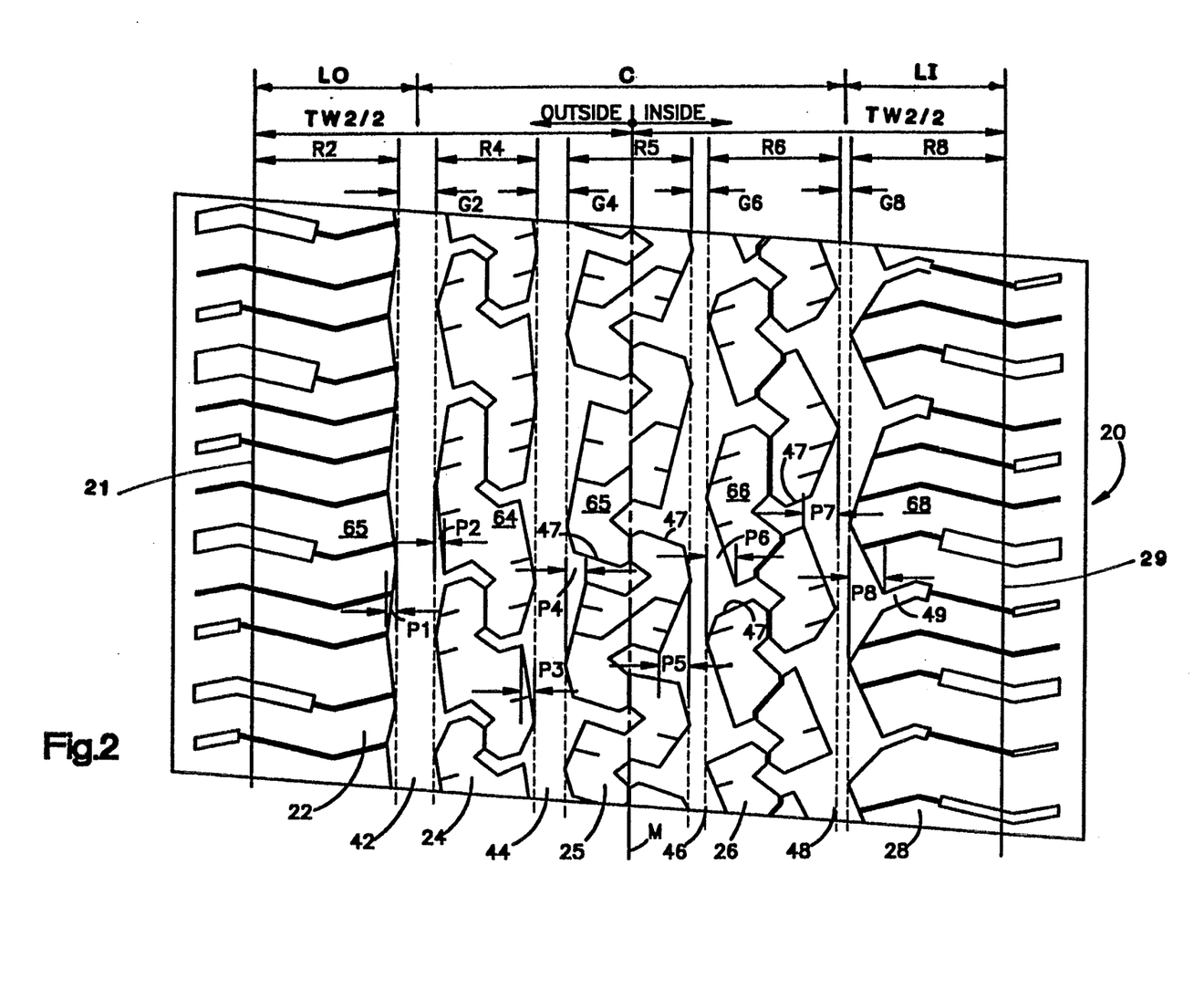
FIG. 2 is an enlarged front elevation view of a portion of a tire having an asymmetrical tread embodying the present invention.

The tread width TW2 is divided into a central segment C containing circumferential ribs 24, 25 and 26 and a pair of lateral segments LO, LI containing lateral ribs 22 and 28 respectively, as illustrated in FIG. 2. The tread 20 has an first side 29 and an second side 21 of tread width TW2 to be properly located when the tire 2 is mounted on a vehicle wheel 7 having a corresponding innerface 3 and a corresponding outerface 1 (FIG. 7). The wheel 7 is positioned on the vehicle such that the outerface 1 of the wheel 7 is viewed from the exterior of the vehicle. The first side 29 of the tread 20 becomes the inner side with respect to the vehicle and the second side 21 of the tread 20 becomes the outer side with respect to the vehicle.

The ground engaging surfaces 62, 64, 65, 66, 68 for the respective ribs 22, 24, 25, 26, 28 are components of the tread pattern and define an asymmetric tread 20.

Figure 1:
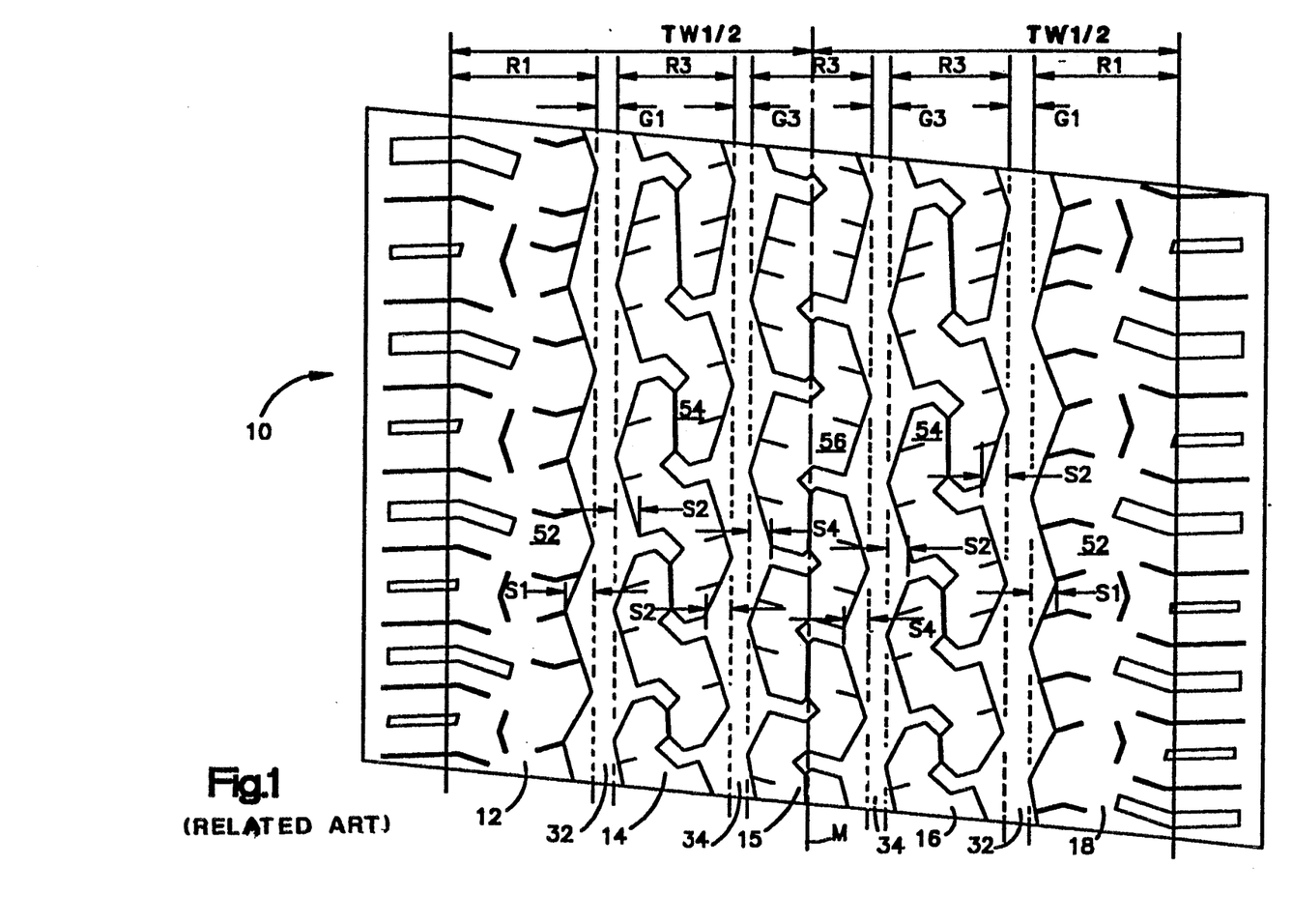
FIG. 1 is an enlarged front elevation view of a portion of a related art tire having a symmetrical tread.

The center rib 25 is preferably bisected by the midcircumferential plane M. Each individual rib 22, 24, 25, 26 or 28 has a respective contact surface ratio. The contact surface ratio is defined as the ratio of the ground surface contact area within a rib width R2, R4, R5, R6, R8 to the total area of the rib circumferentially around the tire 2. The circumference is the total circumferential distance around the tire of a line on the tread surface at the axial midpoint of the respective rib width R2, R4, R5, R6 or R8. For example, the contact surface ratio for a center rib 25 has a preferred value of 0.70. Alternately stated, 70 percent of the total possible surface contact area of center rib 25 located within the rib width R5 is achieved by the series of land surface areas of blocks 65 that comprise the center rib 25 and contact a ground surface. This preferred contact surface ratio of 0.70 for the center rib 25 was specifically selected based on a similar related symmetric tire tread 10 as shown in FIG. 1. Other design features of the asymmetric tread 20 are also based on the features of the symmetric tread 10. A description of the symmetric tread is included below.

The contact surface ratios for the intermediate ribs 24 and 26 as well as for the lateral ribs 22 and 28 for the asymmetric tread 20 of the present invention, and illustrated in FIG. 2, are determined based on specific design criteria for particular applications. The contact surface ratios for ribs 22, 24, 26 and 28 relate to the contact surface ratio of 0.70 for the center rib 25. The value of 0.70 for the contact surface ratio of the center rib 25 was selected because the symmetric tread 10 has this same value for its contact surface ratio for the center rib 15. The center rib 25 of the present invention having the same value for its contact surface ratio establishes a reference from which other contact surface ratios for the remaining ribs 22, 24, 26, 28 can be selected. Other similarities between the symmetrical tread 10 (FIG. 1) design features of the related tire and the design features of the new asymmetric tread 20 of the tire 2 of the present invention will be apparent throughout this description. As previously stated, the same performance characteristics of a tire having the symmetrical tread 10 (FIG. 1) in a straight-ahead driving condition is desirable for a tire 2 having the asymmetric tread 20 (FIG. 2). The performance characteristics include mass, area and one half being like the other half.

The tire 2 is preferably mounted on a wheel and vehicle having the asymmetric tread 20 of the present invention such that a first lateral rib 28 is positioned facing toward the interior of the vehicle wheel well. The second lateral rib 22 is preferably positioned relative to the outside of the vehicle wheel well. Contact surface ratios for the lateral ribs 22 and 28 are selected such that the second or outer lateral rib 22 has a higher value of contact surface ratio than the first or inner lateral rib 28. The contact surface ratios for the first intermediate rib 24 and the second intermediate rib 26 are selected such that the contact surface ratio of a respective rib gradually decreases in the central segment from the outside portion of tread 20 to the inside portion of tread 20, which is left to right as illustrated in FIG. 2. This orientation of the tread 20 positions the ribs 22, 24 having the highest contact surface ratio in a location to resist the relatively large normal forces in the ground contact area of the tread 20. The ribs 26 and 28 having a relatively lower contact surface ratio are in an axial location of the tire to be relatively more compliant in resisting tangential forces in the ground contact area of the tread 20. The contact surface ratio of the first intermediate rib 24 is selected to be greater than the contact surface ratio of the center rib 25 by an additional 14 percent. Therefore, the preferred value of the contact surface ratio for the first intermediate rib 24 is 0.80. The contact surface ratio of the second intermediate rib 26 is selected to have a value less than the predetermined value for the center rib 25 but greater than a minimum value of 0.60. The preferred value for the contact surface ratio of the second intermediate rib 26 is 0.65.

The contact surface ratio of the first lateral rib 28 is selected to have a value at most equal to the value of the contact surface ratio for the first intermediate rib 24. The preferred value for the contact surface ratio of the first lateral rib 28 is 0.80. The second lateral rib 22 preferably has the greatest value of contact surface ratio in comparison with the contact surface ratios of the other ribs 24, 25, 26, 28. A relatively large contact surface ratio for the second lateral rib 22 provides sufficient land areas for blocks 62 to allow for the increase in normal forces due to asymmetric vehicle operations. The contact surface ratio of the second lateral rib 22 is selected to have a value in a range of 125 percent to 135 percent of the contact surface ratio of the center rib 25. The preferred value for the contact surface ratio of the second lateral rib 22 is 0.90.

The symmetric tread 10 of FIG. 1 has been successfully tested for wear and traction. The center rib 15 and the intermediate ribs 14 and 16 all have the same contact surface ratio of 0.70. The two lateral ribs 12 and 18 have the same other contact surface ratio of 0.87. The overall tread width TW1 of the symmetric tread 10 is 177 millimeters. The width is taken perpendicular to a midcircumferential plane. The intermediate ribs 14 and 16 and the center rib 15 have a constant rib width R3 of 28 millimeters. The two lateral ribs 12 and 18 have the same rib width R1 of 33.75 millimeters. The contact surface ratio of both lateral ribs 12 and 18 has a value of 0.87. The tread 20 is substantially symmetrical with respect to the midcircumferential plane defining an Inner portion and an outer portion or each tread 10 with respect to the vehicle. As a result of surface contact areas being equal and symmetrical on either side of the midcircumferential plane, a residual aligning torque is maintained at a relatively low value. The residual aligning torque results from unbalanced tangential forces at the tire-ground contact that turns the tire about a turn axis or kingpin. For the symmetrical tread 10 either lateral rib 12 or lateral rib 18 may be exterior to the vehicle. The grooves 32 adjacent to lateral ribs 12 and 18 each have a width of G1. The grooves 34 adjacent to the center rib 15 have a width G3 of 5.75 millimeters. The total see-through groove width being the sum of all groove widths G1,G3 is 25.5 millimeters. Other features of the symmetrical tread 10 will be discussed and compared with the asymmetrical tread 20 of this invention below.

The asymmetrical tread 20 of FIG. 2 differs from the symmetrical tread 10 of FIG. 1 in that the widths R2, R4, R5, R6 and R8 of respective ribs 22, 24, 25, 26 and 28 are different than the corresponding widths R1 and R3 of ribs 12, 14, 15, 16 and 18. The center rib 25 has a center width R5 which is the same as width R3 of center rib 15 for the symmetric tire 10 illustrated in FIG. 1. The relative widths R4,R6 of intermediate ribs 24 and 26 depend on their previously selected contact surface ratios. It is desirable to maintain the same contact surface area for ribs 24 and 26 of the present invention.

Thus, the larger the contact surface ratio desired the smaller the required rib width for that rib. This relationship enables the asymmetric tread 20 of the present invention to have equal surface areas in contact with the road surface for each rib having substantially the same axial distance from the midcircumferential plane M. Therefore, the first intermediate rib 24 has a width R4 which is less than the width R6 of the second intermediate rib 26. The center rib 25 has a width R5 greater than width R4 of the first intermediate rib 24 and less than width R6 of the second intermediate rib 26. However, the surface contact areas on either side of the midcircumferential plane M are equal. This results in relatively uniform normal and tangential forces on the respective ribs 22, 24, 25, 26, 28. Uniform forces are important in maintaining relatively low wear rates.

The product of the rib width times the contact surface ratio for each respective rib is the same value for the two intermediate ribs 24,26 and the center rib 25. This relationship is required to maintain the contact surface area for each of these ribs 24,25,26 equal. Similarly the contact surface ratio of the first lateral rib 28 times the first lateral rib width R8 is equal to the contact surface ratio of the second lateral rib 22 times the second lateral width R2. This maintains the same contact surface area for each of the lateral ribs 22,28.

The product of the contact surface ratio and the respective width of each rib is defined herein as the surface contact width of the respective rib. Essentially the surface contact width is the width of an equivalent solid rib that is equal in area to the actual rib. The surface contact width of the first intermediate rib 24, the second intermediate rib 26, and the center rib 25 are all substantially equal. The contact surface widths of both lateral ribs 22 and 28 are also substantially equal. This feature of the asymmetric tread 20 is the same for the symmetric tread 10. Thus, the residual aligning torque is maintained at a relatively low value. Furthermore, the preferred difference in the surface contact widths between the center rib 25 and the first lateral rib 28 of the asymmetric tread 20 is the same as the difference in surface contact widths between the center rib 15 and the lateral rib 18 of the symmetric tread 10. This allows the asymmetrical tread 20 to support symmetrical loads in a manner similar to the symmetrical tread 10. Symmetrical loads are those that have essentially the same magnitude at equal axial distances from the midcircumferential plane M.

Wet lateral traction of the tire 2 having the tread 20 of the present invention is enhanced by redistribution of the respective see-through groove widths G2, G4, G6, & G8 of the asymmetric tread 20 in relation to the groove widths G1 & G3 of the symmetric tread 10. Circumferential groove widths G2, G4, G6, G8 are progressively wider in the axial direction going widthwise from the inside to the outside of the asymmetric tread 20. This gradual increase provides a longitudinal wet traction equal to that for the symmetrical tread 10. Improvements in mud and snow traction are also expected for the asymmetric tread 20. A preferred groove width G2 adjacent to the second lateral rib 22 is 9.5 millimeters compared with a groove width G8 adjacent to the first lateral rib 28 of 3.5 millimeters. The ratio of G2 to G8 may vary from a value of approximately 2 to approximately 10. A preferred value of groove width G4 is 8.0 millimeters and the preferred value of groove width G6 is 4.5 millimeters. The total see-through groove width being G2+G4+G6+G8 is 25.5 millimeters for the asymmetric tread 20. This is the same as the see-through groove width total for the symmetric tread 10. Larger grooves on the outside of a tread are desirable to keep the tire in contact with the road during a turn. The larger groove widths G2,G4 being in the outside portion of the asymmetric tread 20 provides increased lateral wet and dry traction performance when compared with the symmetric tread 10 having a groove width G1 adjacent to the lateral ribs 12 & 18 of 7.0 millimeters. The preferred values defined herein are for an millimeter section width) tire. These values may vary according to the size of tire 4 illustrated in FIGS. 5, 6 and 7. Any changes in the preferred dimensions for the five rib tire 4 of this invention will be proportionally changed with tire size.

Figure 3:
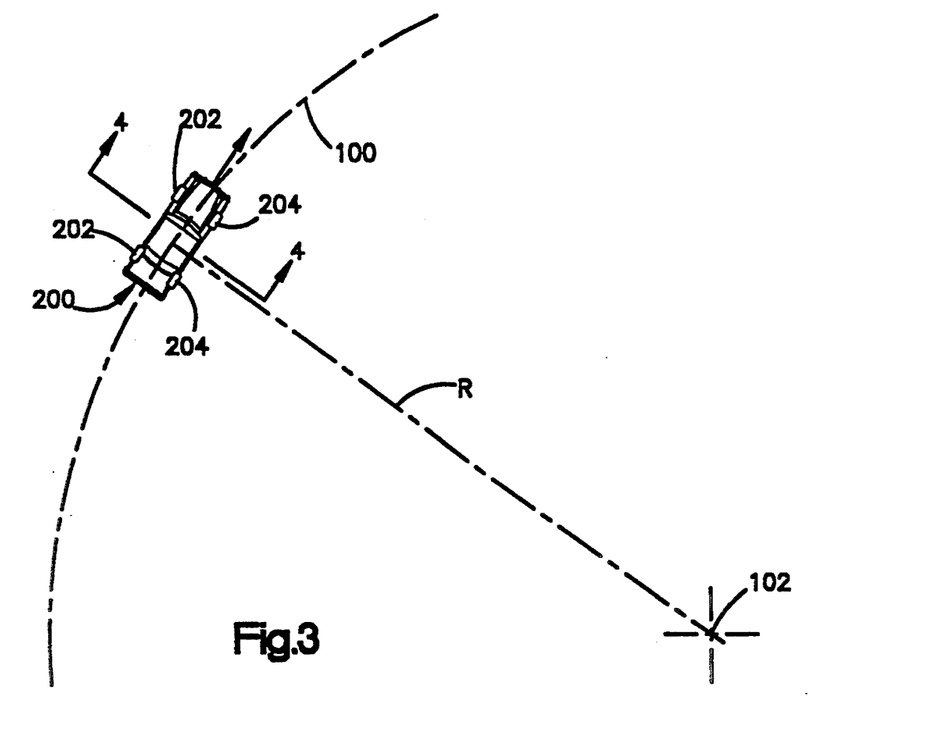
FIG. 3 is a plan view illustrating a turning maneuver of a vehicle.
Figure 4:
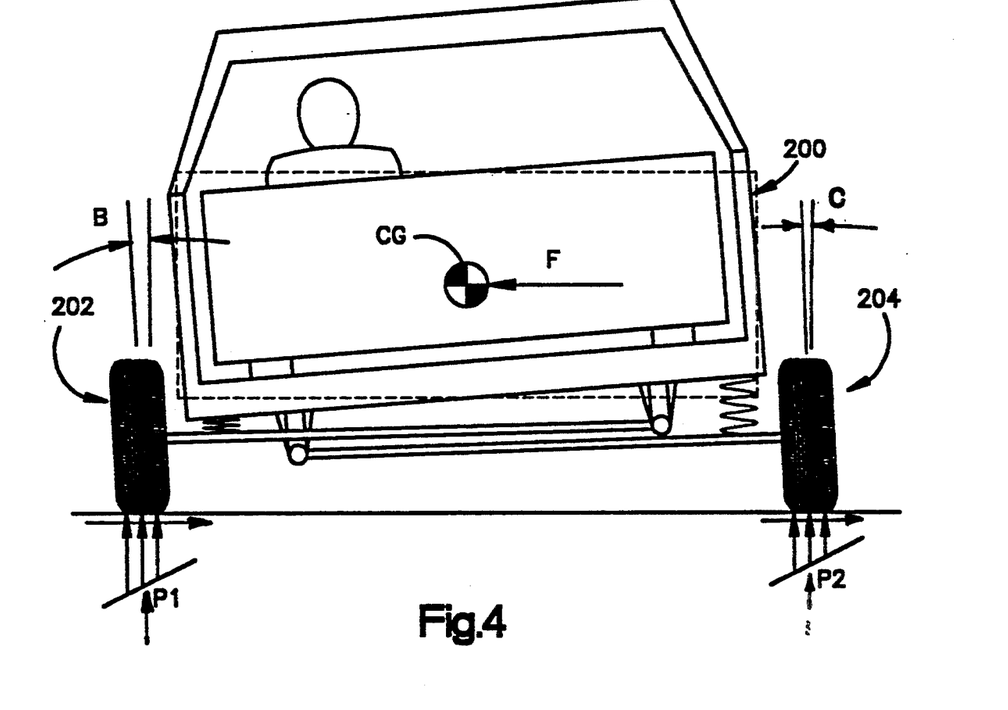
FIG. 4 is a sectional view of a vehicle with a swing axle suspension system during a cornering maneuver.

Load transferred and vehicle wheel camber angle B during cornering operations of the vehicle results in a load increase on the outside portion of the asymmetric tread 20 for those tires 202 on the outside of the vehicle path 100 (FIGS. 3,4). That is, the tires 202 turning in a path having the largest radius R from a turn axis 102 are subjected to greater supporting loads than the tires 204. Larger grooves G2, G4 on the outside portion of the asymmetric tread 20 of tires 202 are desirable to keep the tire in contact with the road surface without hydroplaning. The sum of the see-through groove widths for the asymmetric tread 20 is the same as the sum of the see-through groove widths for the symmetric tread 10. This maintains straight-ahead wet traction properties of the asymmetric tread 20 equal to those of the symmetrical tread 10.

The see-through groove widths G2, G4, G6, & G8 of the zigzag circumferential grooves 42, 44, 46, and 48, respectively, maintain relatively good wet traction as well as snow traction performance compared to tread 10. Each circumferential zigzag groove 42, 44, 46, 48 has an associated axial relief P1 through P8 (FIG. 2) measured axially at each axial face of each groove 42, 44, 46, 48 at respective land side or edge surfaces of each tread block 62, 64, 65, 66, & 68. Land surfaces of the tread blocks 62, 64, 65, 66, & 68 are not allowed to overlap to create a negative see-through groove width. The sum of P1+P2+P3+P4 defines a first pace for the asymmetric tread 20. The sum of P5+P6+P7+P8 defines a second pace of the asymmetric tread 20. The first pace being on the outside portion of the asymmetric tread 20 when the tire 2 is mounted on a vehicle is at most equal to 50 percent of the second pace being on the inside portion of the asymmetric tread 20. The larger second pace on the inside portion of the asymmetric tread 20 provides relatively good traction on snow or other soft road surfaces. The exposed lateral edges 47 of the tread blocks provide relatively good "grip" in snow and during other soft surface encounters. Snow traction is further enhanced by land surfaces 47 which have an acute angle between 70 degrees and 90 degrees with respect to the midcircumferential plane M. This exposes relatively more contact area to grip the snow. Lateral grooves 49 in the first lateral rib 28 also provide additional snow traction capabilities for this asymmetric tread 20 for the same reasons.

The overall tread width TW2 of the asymmetric tread 20 has a preferred value of 177 millimeters as shown in FIG. 2 for a 235 millimeter section width tire 2. This preferred tread width TW2 is selected to be equal to the tread width TW1 of a similar symmetric tread 10 (FIG. 1) for a tire having the same size, inflation pressure and imposed load. As discussed previously, the total see-through groove width is 25.5 millimeters which results in a total rib width R1+R4+R5+R6+R8 having a preferred value of 151.5 millimeters. With the surface contact width of the asymmetric tread 20 of FIG. 2 being the same as the surface contact width for the symmetric tread 10 of FIG. 1, the relative volumes of rubber within tread widths TW1 and TW2 of the two respective treads 10 and 20 can be compared. Furthermore, with similar groove configurations for the asymmetric tread 20 grooves 42,44,46,48 compared with the groove configurations of the symmetric tread 10 grooves 32,34, equal volumes of tread rubber exist for the two respective treads. This is combined with portions of one tire having the asymmetric tread 20 being equal to other portions of another tire having the symmetric tread 10. Therefore, the one tire 2 having asymmetric tread 20 has a rolling resistance substantially the same as the rolling resistance of the other tire 10 in FIG. 1.

Additional volumetric relationships exist for the asymmetric tread 20. The two lateral ribs 22 and 28 have the same volume of rubber and the two intermediate ribs 24 and 26, as well as the center rib 25, have the same volume of rubber for the tread 20. In addition, the volume of tread rubber on the outside half portion of the asymmetric tread 20 equals the volume of tread rubber on the inside half portion of the asymmetric tread 20. These volumetric relationships help create a uniform distribution of the normal stresses widthwise across the asymmetric tread 20. This uniform distribution of rubber volume provides a uniform wear pattern axially across the asymmetric tread 20. The uniform distribution of rubber volume also provides good uniformity of the tire 2 and provides for conicity values during running similar to those of the symmetrical tread 10 (FIG. 1). Since the rubber volumes with known orthotropic properties are equal on either side of midcircumferential plane M, the residual aligning torque induced by the asymmetric tread 20 remains at a relatively low value in comparison to prior art tires having other asymmetrical treads. Furthermore, the stresses on axially adjacent ribs of the asymmetric tread 20 having substantially equal rubber volumes will not introduce unbalanced normal and tangential forces with respect to the two sides of the tire 2. This again contributes to a uniform wear rate across the asymmetrical tread 20.

Another feature of the asymmetric tread 20 for uniform normal stresses widthwise across the asymmetric tread 20 is the lateral placement of the respective ribs 22,24,25,26,28. Allowance for the effect of the asymmetric tread 20 when engaging the road surface at a contact patch is made. The tread 20 deforms when it makes contact with the ground surface by narrowing the tread non-contact width from a width greater than TW2 to the width TW2. The difference in the lateral or widthwise stiffness of the first intermediate rib 24 compared with the lateral or widthwise stiffness of the second intermediate rib 26 is important. This widthwise stiffness difference results in first intermediate rib 24 moving closer to the midcircumferential plane M than the second intermediate rib 26 moves towards the midcircumferential plane M. The relative difference in the movement of first intermediate rib 24 compared with second intermediate rib 26 is compensated for by moving first intermediate rib 24 a small incremental distance away from the midcircumferential plane M when the tire is not in contact with the road surface. Although this distance is relatively small, being in a range of 1 millimeter to 2 millimeters, the effect is critical in obtaining balanced normal forces widthwise across the asymmetric tread 20.

Resistance to irregular wear has been improved for the asymmetric tire 20 of FIG. 2 in comparison with the symmetric tire 10 of FIG. 1. This is a result of optimization of the relative contact surface ratios from the outside half portion of the asymmetric tread 20 widthwise to the inside half portion of the asymmetric tread 20. Ribs 22 and 24 of the outside half portion of the asymmetric tread 20 are more closed by having a higher contact surface ratio than ribs 26, 28 of the interior half portion of the asymmetric tread 20. Testing is expected to demonstrate that the second lateral rib 22 has a wear rate less than the wear rate for ribs 12 and 18 of the symmetric tread 10. The wear rate of the first lateral rib 28 is also maintained at a relatively low value comparable with that for lateral ribs 12 and 18 of a symmetric tire 10. The closed pattern of ribs 22 and 24 also reduces the amount of heel-toe wear on the individual blocks 62, 64, and other such "lifting" of tread features as the tire wears. These irregular wear features are part of what is commonly known in the industry as the worn aspect of the tread 20. An increase in the tread life is anticipated for the asymmetrical tread 20 by as much as 20 percent when compared with the symmetrical tread 10 used on the same vehicle performing the same vehicle operations.

Longitudinal compliance of the tread blocks for ribs 26 and 28 of the asymmetric tread 20 located to the inside of the vehicle is greater than the longitudinal compliance of ribs 26 and 28 of the asymmetrical tread 20 located to the outside of the vehicle. Compliance is defined as the relative deformation of a tread block under tangential forces. Longitudinal compliance is the movement of a tread block in a direction parallel to the midcircumferential plane M resulting from a tangential force on the tread blocks in the same respective direction. Ribs which have a larger compliance are more active in providing good traction in snow and in other soft material ground contact operations of the vehicle. The longitudinal compliance of the tread blocks 66 of the second intermediate rib 26 is increased by at least 100 percent over the longitudinal compliance of blocks 64 of the first intermediate rib 24. In addition, the second intermediate rib 26 of the asymmetric tread 20 has a longitudinal compliance at least 20 percent higher than the intermediate ribs 14 or 16 of the symmetric tread 10.

Testing is expected to demonstrate that the noise level of the asymmetric tread 20 is reduced by at least 3 dBs compared with the noise level of a symmetrical tread 10. The difference in the configuration (size and shape) and angular orientation of blocks 64 of the first intermediate rib 24 compared with blocks 66 of the second intermediate rib 26 should be apparent as illustrated in FIG. 2. This difference results in the first intermediate rib 24 emitting noise at a difference intensity (power level) and frequency in comparison with the intensity and frequency of the noise emitted by the second intermediate rib 26. The center rib 25 is also different in configuration and will have its own separate intensity vs. frequency of noise than ribs 24 and 26. The resulting noise from ribs 24, 25 and 26 has a broader frequency range with smaller amplitudes of the intensity within any particular frequency range than symmetrical tire 10 having equal rib 14, 15 and 16 configurations. The result is less noise being perceived from the asymmetric tread 20 in comparison with symmetric tread 10.

Unsymmetrical camber between wheels of a vehicle during vehicular maneuvers may occur for some vehicle suspension systems. Also, the camber of a wheel having a tire properly mounted thereupon produces nonuniform forces widthwise across the tire. For example, the suspension system of FIGS. 3 and 4 may yield an unsymmetrical camber angle B. The tires 202 on the outside of the cornering path 100 have a larger camber angle B than the camber angle C of tires 204 on the inside of the cornering path 100. Unsymmetrical camber occurs during cornering maneuvers of the vehicle turning about a turn axis 102. The camber also yields a condition on the tire when mounted on the vehicle in which the inside portion of the asymmetric tread 20 is subjected to a different loading condition than the outside portion of the asymmetric tread 20. The outside portion of the asymmetric tread 20 for a tire 202 on the side of the vehicle being outside of the cornering path 100 supports a load larger than the load on the inside portion of the asymmetric tread 20. Furthermore, tires 202 on the outside of the vehicle path 100 are supporting a load P1 higher than the load P2 supported by tires 204 on the inside of the vehicle path 100. The asymmetric tread 20 of the present invention compensates for or offsets the unsymmetrical camber induced by the vehicle suspension system and provides a tire with superior overall performance when compared with a symmetric tire tread 10 having similar tread pattern design features.

TEST RESULTS

Vehicle tests were conducted using the asymmetrical tread 20 and the symmetrical tread 10 comprising two respective sets of 235 millimeter section width tires. Subjective vehicle ride and handling results were obtained and performance was rated on a scale of 1 to 10, with 1 being poor and 10 being excellent. The table below shows comparative results using the tire set with the symmetrical tread 10 as the base.

| PERFORMANCE PARAMETER | TIRE WITH SYMMETRICAL TREAD | TIRE WITH ASYMMETRICAL TREAD |
|---|---|---|
| WET LATERAL TRACTION | BASE | BASE + 0.25 |
| LATERAL MANEUVERS | BASE | BASE + 0.50 |
| OVERALL STEERING | BASE | BASE + 0.50 |

Objective traction test results were also obtained for the same two sets of 235 millimeter section width tires. Wet and dry traction tests confirm that the tire 2 with the asymmetrical tread 20 (FIG. 2) has substantially equal longitudinal traction performance when compared with the a tire having the symmetrical tread 10 (FIG. 1). The volumes of tread rubber being equal, the mass of tire 2 is substantially equal to the mass of a tire of the same size having a symmetrical tread 10. The same is true with the rolling resistance of tire 2 being substantially unchanged between the tires. Improvements in noise, traction on snow and traction on soft material performance for the tire 2 with the asymmetrical tread 20 are anticipated compared to tread 10.

From the above description of a preferred embodiment of the invention, those skilled in the art will perceive improvements, changes and modifications. Such improvements, changes and modifications within the skill of the art are intended to be covered by the appended claims.

Having described a preferred embodiment of the invention, what is claimed is:

1. An asymmetrical tread for a tire having a midcircumferential plane and an inner side and an outer side defining two tread halves and mounted on a vehicle wheel, said tread comprising:
   a plurality of longitudinally extending ribs in said inner and outer sides and each having a circumferential length, said ribs being contained in a central segment plus two lateral segments of said tread, each adjacent pair of said ribs being separated by a respective uninterrupted see-through longitudinal groove, each of said ribs having:
   a circumferential surface contact area axially distributed over the circumferential length;
   a rib width defined as the distance measured along a direction perpendicular to the midcircumferential plane between the outermost edge and the innermost edge portions of said rib; and
   a contact surface ratio defined as a ratio between said circumferential surface contact area and the product of said rib width times the circumferential length of said rib, said longitudinal extending ribs in the central segment of said tread include a center rib located on the midcircumferential plane of the tire and have substantially equal first surface contact areas and contact surface ratios which sequentially decrease when taken from the outer side to the inner side of said tread, said longitudinal extending ribs in the two lateral segments of said tread have first and second lateral ribs in the inner and outer sides respectfully, wherein the contact areas are substantially equal but with differing contact surface ratios for the two lateral ribs.

2. The tread set forth in claim 1, wherein said longitudinal grooves each have a see-through width taken perpendicular to the midcircumferential plane of the tread and wherein the widths of said grooves sequentially decrease when taken from the outer side to the inner side of said tread.

3. The tread set forth in claim 1 wherein said longitudinal extending ribs are such that the contact surface ratio of said first lateral rib is less than the contact surface ratio of said second lateral rib.

4. The tread set forth in claim 3 wherein said longitudinally extending ribs include a first intermediate rib located to the outermost portion of said central segment, the contact surface ratio of said first intermediate rib being substantially equal to the contact surface ratio of said first lateral rib.

5. The tread set forth in claim 4 wherein said center rib is symmetrically located with respect to the midcircumferential plane of said tire, the contact surface ratio of said center rib being equal to a predetermined value and the contact surface ratio of said first intermediate rib being greater than the predetermined value for said center rib by approximately 0.10.

6. The tread set forth in claim 5, wherein said longitudinally extending ribs include a second intermediate rib located to the innermost portion of said central segment, the contact surface ratio of said second intermediate rib being less than the predetermined value for said center rib and at least equal to 0.60.

7. The tread set forth in claim 5, wherein the contact surface ratio of said second lateral rib has a maximum value and is in the range of 120 percent to 130 percent of the predetermined value for said center rib, and wherein the contact surface ratio of said first lateral rib is in the range of 105 percent to 120 percent of the predetermined value for said center rib.

8. The tread set forth in claim 3, wherein a first surface contact area for said longitudinally extending ribs in the central segment of said tread has a value approximately 65 percent of said second surface contact area for said first and second lateral ribs in the two lateral segments of said tread.

9. The tread set forth in claim 1, wherein said longitudinally extending ribs further comprise: a center rib with a center width symmetrical with the midcircumferential plane of said tread; a first intermediate rib located to the outermost portion of said central segment having a first width in a range of 80 percent to 85 percent of said center width; and a first lateral rib contained in the innermost lateral segment of said tread having a first lateral width in a range of 125 percent to 135 percent of said center width.

10. The tread set forth in claim 9, wherein said longitudinally extending ribs further comprise: a second intermediate rib located to the innermost portion of said central segment with a second width, said second width being in a range of 105 percent to 110 percent of said center width; and a second lateral rib contained in the outermost lateral segment of said tread with a second lateral width, said second lateral width being in a range of 115 percent to 125 percent of said center width.

11. The tread set forth in claim 1, wherein said tread comprises a volume of tread rubber on the outside of the midcircumferential plane approximately equal to another volume of rubber on the inside of the midcircumferential plane, whereas said tread has a uniform wear pattern and imparts to said vehicle wheel a relatively low residual aligning torque and conicity.

12. The tread set forth in claim 1, wherein said tread further comprises a pace having the pace of both the inner and outer sides defined as the sum of zigzag axial relief distances at each axial face of each groove, at a respective land side surface of each adjacent respective rib, wherein a first pace of said tread for the outside portion of the tread is less than 50 percent of a second pace of said tread for the inside portion of the tread, whereas the sum of said first and second paces being at least equal to a predetermined pace for a symmetrical tire.

* * * * *